(12) United States Patent
Crow et al.

(10) Patent No.: US 8,375,527 B1
(45) Date of Patent: Feb. 19, 2013

(54) ACTUATED WEDGE SOCKET ASSEMBLY

(75) Inventors: Stephan M. Crow, Tulsa, OK (US);
Larry Postelwait, Catoosa, OK (US)

(73) Assignee: The Crosby Group, Inc., Tulsa, OK (US)

( * ) Notice: Subject to any disclaimer, the term of this patent is extended or adjusted under 35 U.S.C. 154(b) by 327 days.

(21) Appl. No.: 12/851,208

(22) Filed: Aug. 5, 2010

Related U.S. Application Data

(60) Provisional application No. 61/232,286, filed on Aug. 7, 2009.

(51) Int. Cl.
 *F16G 11/00* (2006.01)
(52) U.S. Cl. ............ 24/136 L; 403/211; 24/136 R
(58) Field of Classification Search ............ 24/136 R, 24/136 L, 115 M, 136 K, 136 B; 403/211, 403/314, 374.1, 409.1; 187/411, 412, 404, 187/406; 294/102.1
See application file for complete search history.

(56) References Cited

U.S. PATENT DOCUMENTS

| | | | |
|---|---|---|---|
| 2,296,567 A * | 9/1942 | Nielsen ............ 403/211 |
| 3,257,499 A * | 6/1966 | Broske ............ 174/94 R |
| 3,351,986 A * | 11/1967 | Johnson ............ 403/369 |
| 4,730,087 A * | 3/1988 | Werner ............ 174/94 S |
| 4,845,814 A | 7/1989 | Crook | |
| 5,243,739 A * | 9/1993 | Schmidt ............ 24/135 R |
| 5,423,699 A * | 6/1995 | Johnson ............ 439/783 |
| 5,553,360 A | 9/1996 | Lucas et al. | |
| 5,988,929 A * | 11/1999 | Doan ............ 403/281 |
| 6,854,164 B2 | 2/2005 | Bass et al. | |
| 6,869,146 B2 | 3/2005 | Gollahon | |
| 6,898,827 B1 | 5/2005 | Postelwait et al. | |
| 6,918,345 B2 | 7/2005 | Golden et al. | |
| 6,994,487 B2 | 2/2006 | Traktovenko et al. | |
| 7,302,739 B2 | 12/2007 | Christiansson | |
| 7,469,774 B2 | 12/2008 | Ach | |
| 7,707,693 B2 * | 5/2010 | Schaefer ............ 24/31 R |

* cited by examiner

*Primary Examiner* — Robert J Sandy
*Assistant Examiner* — Rowland D Do
(74) *Attorney, Agent, or Firm* — Head, Johnson & Kachigian, P.C.

(57) ABSTRACT

An actuated wedge socket assembly. The assembly includes a wedge socket having an elongated hollow basket with a large opening at a first end, a small opening at an opposed second end, and an open interior cross-section tapering from the large opening to the small opening. A wedge includes a large end, an opposed small end, and a peripheral groove to receive a wire rope therein. A mechanism is provided to mechanically move and seat the wedge and the wire rope in the wedge socket to a controlled depth.

5 Claims, 6 Drawing Sheets

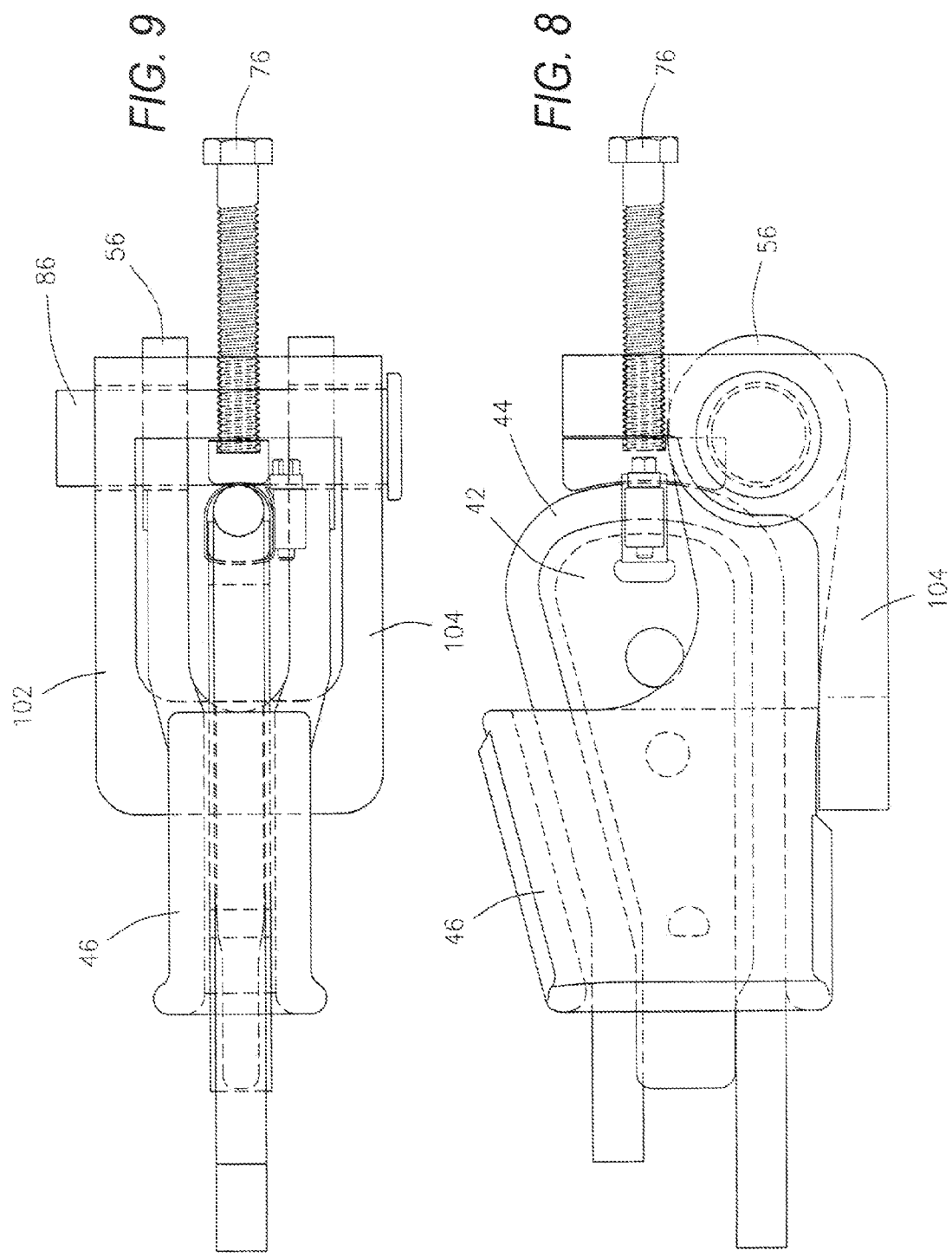

ACTUATED WEDGE SOCKET ASSEMBLY

BACKGROUND OF THE INVENTION

1. Field of the Invention

The present invention relates to an actuated wedge socket assembly for termination of a wire rope. In particular, the present invention relates to an actuated wedge socket assembly which provides controlled loading which will enhance efficiencies of the wire rope and wedge socket assembly.

2. Prior Art

Wire rope or wire line is often used to lift, pull or move heavy objects. One type of wire rope consists of several strands which are laid or twisted together in a helical pattern. Each strand may likewise be made up of metal wires twisted or laid together in a helical pattern. Wire rope is frequently made from carbon steel wires, although other materials may be used as well.

Wire rope can be used to transmit motion through various planes or angles, can be used to tie down or hold back objects, and can be used to counter balance, guide or lift objects.

The end of a wire rope can not be easily connected to objects or equipment and, accordingly, there are different ways to secure the ends of a wire rope. Ideally, force and motion are transferred from the end of the wire rope efficiently. End terminations are, therefore, of great importance for transferring these forces and motions.

Examples of wire rope terminations include wire rope sockets (open and closed spelter and swage), mechanical splice terminations, and clip terminations. Another type of wire rope termination which may be installed in the field is a wedge socket, which is simple, easy and quick to apply and to disassemble.

A wedge socket termination is useful in a number of applications. One application would be in a high-wear region where the rope may be periodically trimmed, requiring the termination to be removed and reapplied.

In order to attach a wire rope to a wedge socket, one end of the wire rope is passed through a hollow basket or socket from a smaller opening to a larger opening. Thereafter, the wire rope is positioned in a peripheral groove around the circumference of a wedge. The end of the wire rope is then run back through the hollow basket of the wedge socket from the larger opening to the smaller opening. The wedge with the wire rope around the circumference is then inserted into the open basket of the wedge socket, trapping the wire rope between the edge of the wedge and the interior of the basket. The taper of the wedge and the taper of the inside of the basket or socket combine so that when tension is put on the wire rope, the wedge is pulled by the wire rope and firmly held in place.

An example of an existing wedge socket design is disclosed in Assignee's U.S. Pat. No. 4,845,814 entitled "Wedge Socket". In addition, Assignee's U.S. Pat. No. 5,953,360 entitled "Extended Wedge Socket Assembly" discloses a wedge socket assembly having an extended portion on the smaller end of the wedge to act as a retaining mechanism for retaining the wedge in the socket.

During the process of seating the wire rope and the wedge in the socket, the wire rope will be formed and/or compressed. Because of this, end terminations will not develop the full strength of the wire rope used. The wire rope industry has determined terminal efficiencies for various types of end terminations. The efficiency of a termination is a rating derived as a ratio of the expected ultimate strength of the terminated wire rope assembly to its published catalog breaking strength. Wedge sockets should achieve an efficiency of approximately 70 to 80%. The efficiency is defined as a percentage of the load carrying force of the wire rope within the wedge socket assembly after installation. For example, for a 50,000 pound breaking strength wire rope, an 80% efficiency would mean that the wire rope within the assembled wedge socket would support up to 40,000 pounds of force. For example, the U.S. Federal government has a specification that wire rope sockets should have an ultimate assembly strength of about 70% of the wire rope strength (see Federal Specification RRS550D entitled "Sockets, Wire Rope").

As the diameter of the wire rope increases, so does the difficulty in manually manipulating the wire rope around the wedge and into the socket. Accordingly, it would be desirable to have an actuated wedge assembly to assemble the termination in the field.

Additionally, recently, new high strength wire rope designs have been developed which include compacted strand and rotation resistant ropes. These new high strength wire ropes are often compacted, swaged or formed during manufacture in order to minimize the diameter and maximize the metal cross section. These high strength wire ropes tend to be stiffer and more resistant to bending than traditional wire ropes and, accordingly, have greater difficulty accommodating the relatively sharp bending radius during assembly when the wire rope is wrapped around the peripheral edge of the wedge.

The standard procedure to assemble a wire rope wedge socket assembly in the field is for an installer to drive the large end of the wedge and the wire rope into the wedge socket as deep as possible with a hammer (see Wire Rope Technical Board—Wire Rope Users Manual). The force from hammering is not measured and may vary widely. Thereafter, the installer is instructed to apply a first or test load to the live end of the wire rope to fully seat the wedge into the socket. A slight tilting of the wedge within the socket may occur due to an unbalanced load being applied to the wedge during the recommended first load to fully seat the wedge application. The unbalanced load occurs because only the live line is acting to seat the wedge, and the tendency is for the wedge to rotate due to the moment being applied.

Through testing, Applicants have determined that the assembly pre-load requirements vary depending on the unique construction and manufacturing processes of different brands of wire rope. The traditional methods of hammering the wedge into place and applying a random first load may not achieve the desired wire rope termination efficiency.

Accordingly, it is desirable to provide an actuated mechanism as a method to engage and assemble a wedge and wire rope with a wedge socket.

It is an additional object and purpose of the present invention to provide controlled seating of the wire rope and the wedge in the wedge socket at the time of assembly.

It is a further object and purpose of the present invention to assist in the installation of a wedge and wire rope into a wedge socket.

It is a further object and purpose of the present invention to provide increased efficiency of wedge socket terminations with use of an external force to seat the wedge and wire rope in the socket.

It is a further object and purpose of the present invention to provide increased efficiency of wedge socket terminations by uniformly and evenly loading the wedge and rope into the wedge socket.

It is a further object and purpose of the present invention to provide a mechanical mechanism to seat the wedge and wire rope in the socket using tools readily available in the field.

It is a further object and purpose of the present invention to provide an actuated wedge socket assembly that may be utilized for new applications and may also be retrofit to existing wedge socket assemblies.

SUMMARY OF THE INVENTION

The present invention is directed to an actuated wedge socket assembly for termination of a wire rope. The assembly includes a wedge socket having an elongated hollow basket with an open interior cross-section tapering from a large end opening to a small end opening.

The wedge socket includes a connector extending from the large end opening, such as a pair of opposed jaws to receive a transverse pin.

The wedge socket assembly also includes a wedge having a large end, an opposed small end, and a peripheral edge groove in order to receive a wire rope therein.

The present invention provides a mechanism to mechanically move and seat the wedge and the wire rope in the wedge socket to a controlled depth.

In one preferred embodiment, a fork assembly includes a pair of extending legs to straddle the extended small end of the wedge. The ends of the extending legs react against the smaller end of the wedge socket. A threaded bolt extends through an opening in the fork assembly. The threaded bolt is received in a threaded opening in the extended small end of the wedge. As the bolt is rotated in a first direction, the engagement between the threaded bolt and the wedge will cause the wedge, and the wire rope, to be pulled into the wedge socket. The amount of torque or force applied to rotating the threaded bolt will determine the force pulling the wedge and the wire rope into the wedge socket.

A modified wire rope clip base may be placed over the dead end of the wire rope and a pair of fasteners inserted through the wire rope clip base with the fasteners received in threaded openings in the fork assembly to secure the dead end of the wire rope.

BRIEF DESCRIPTION OF THE DRAWINGS

FIGS. 8 and 9 illustrate a further alternate embodiment of the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
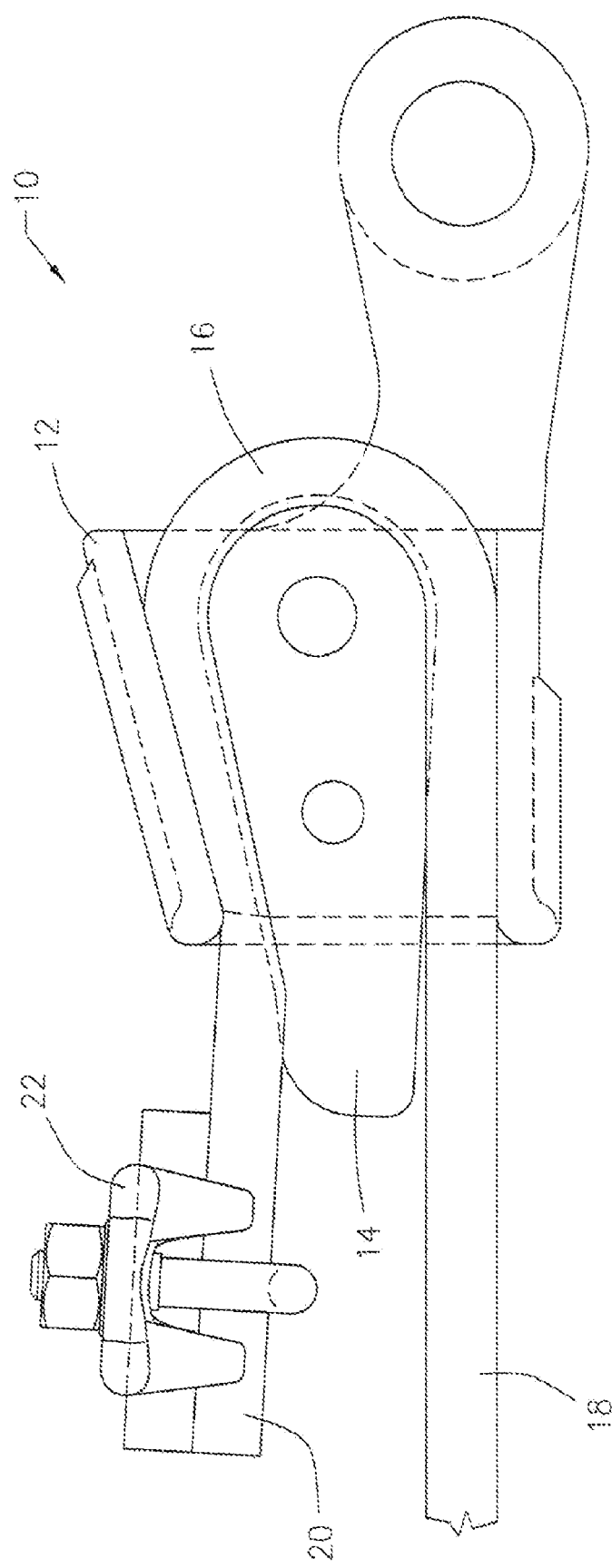
FIG. 1 illustrates a simplified diagrammatic view of a prior art standard wedge socket assembly.

Referring to the drawings in detail, FIG. 1 illustrates a simplified diagrammatic view of a prior art standard wedge socket assembly 10.

The prior art wedge socket assembly 10 includes a wedge socket 12 (shown cut-away for clarity) with a tapered interior. The wedge socket assembly 10 also includes a wedge 14 with a peripheral groove to receive a wire rope 16 therein. The wire rope 16 includes a live line end 18 which would be connected to a load (not shown) and a dead end 20 which may include an optional clip 22 to prevent the dead end and wedge 14 from coming out of the socket 12.

Figure 2:
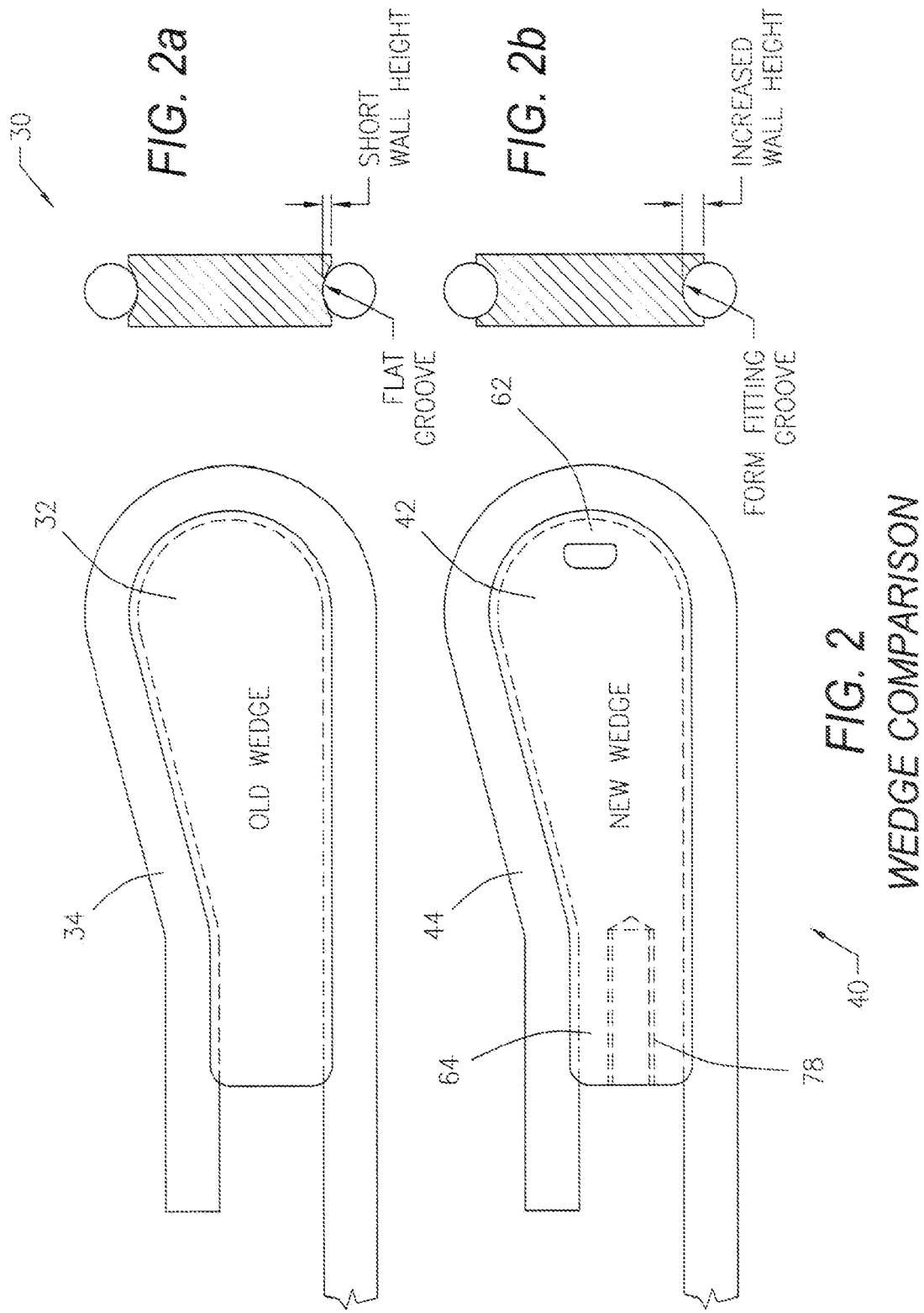
FIGS. 2A and 2B illustrate a comparison of a prior art extended wedge assembly and an actuated wedge socket assembly constructed in accordance with the present invention.

FIG. 2 illustrates a comparison of a prior art extended wedge and wire rope assembly 30 (FIG. 2A) compared to an actuated wedge and wire rope assembly of the present invention 40 (FIG. 2B). The wedge socket in each case has been removed for ease of viewing.

FIG. 2B illustrates the actuated wire rope assembly 40 of the present invention which includes a wedge 42 and a wire rope 44 (to be described in detail herein). The wedge socket has been removed for ease of viewing.

Figures 3, 4:
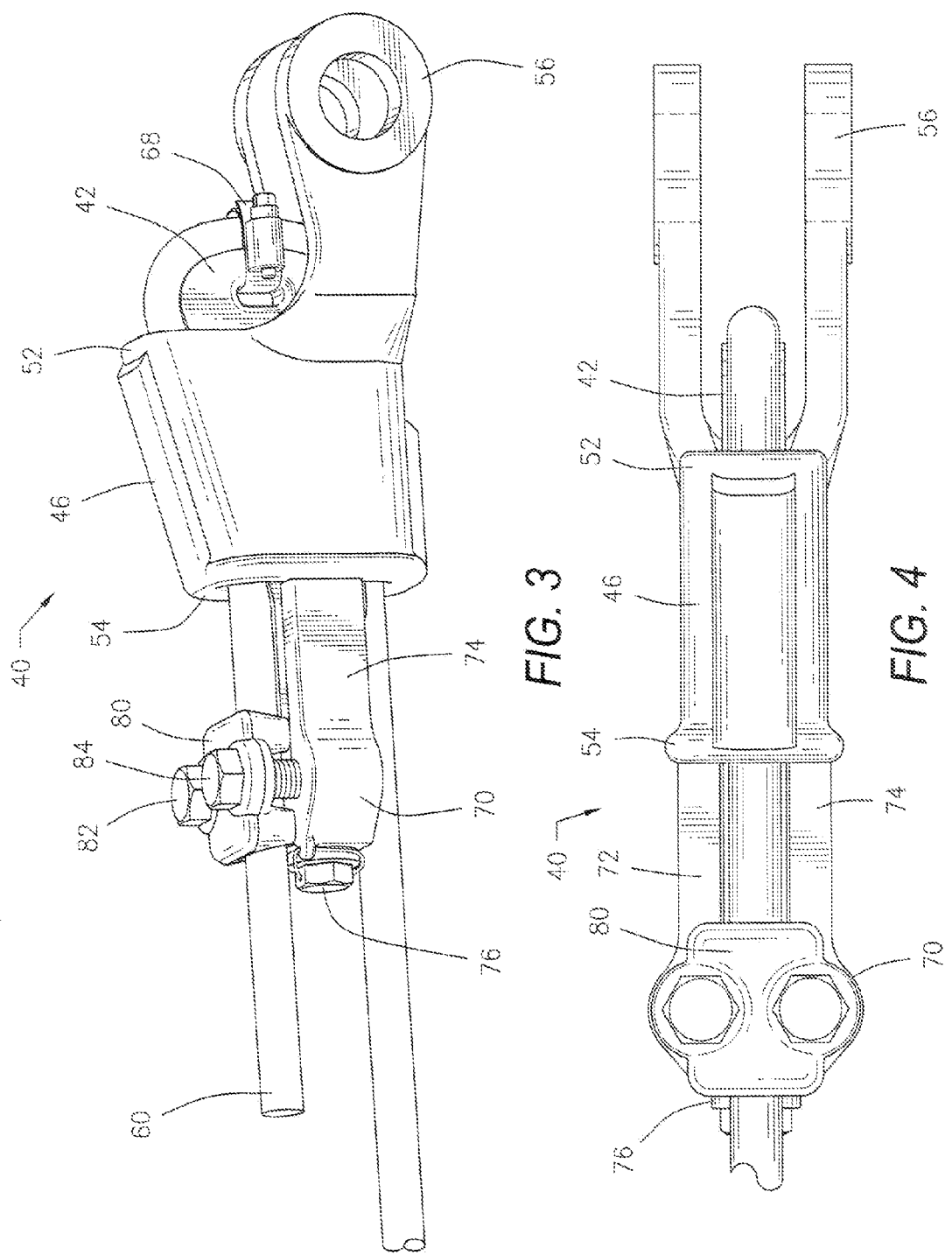
FIG. 3 illustrates a perspective view and FIG. 4 illustrates a top view of the actuated wedge socket assembly of the present invention.
Figure 5:
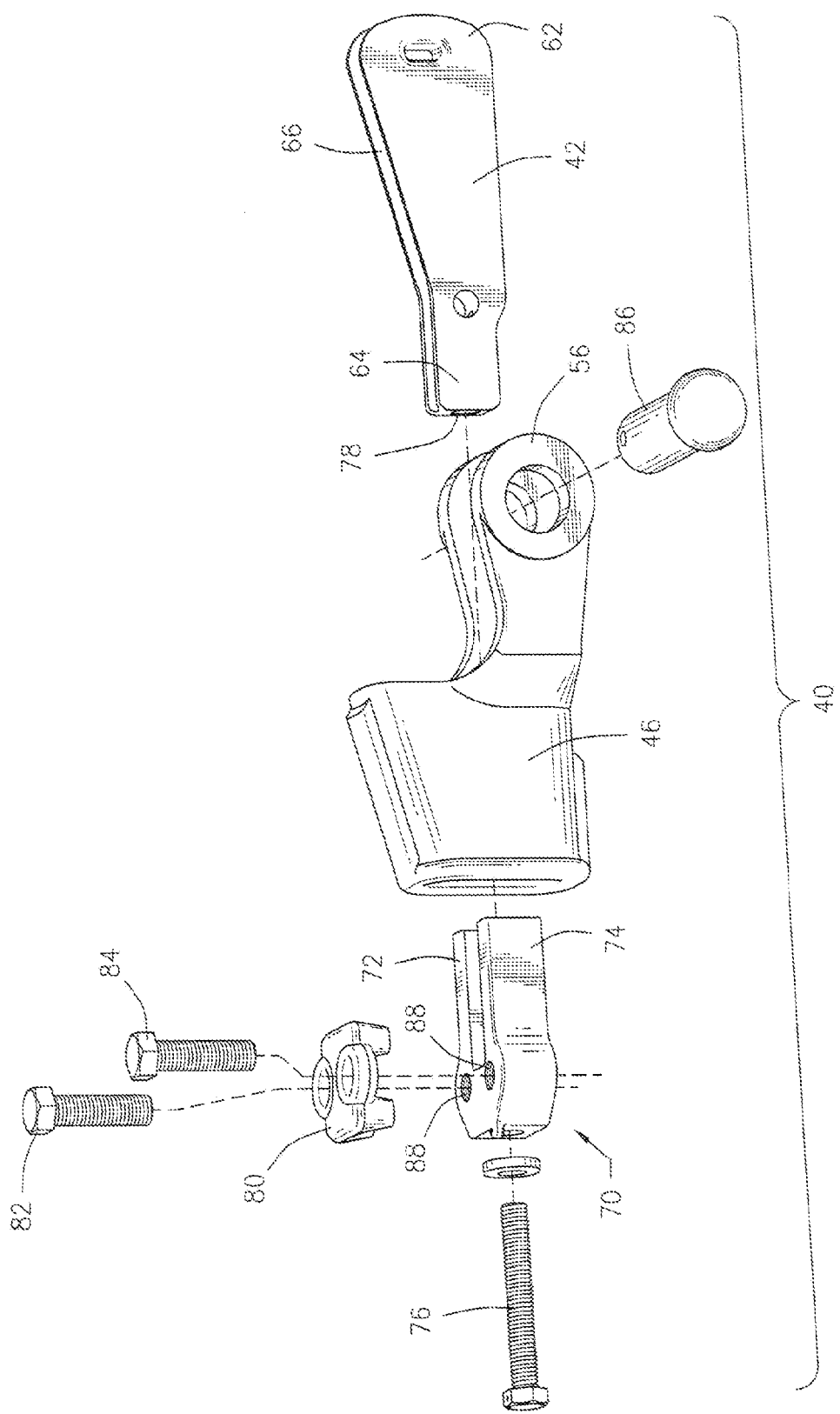
FIG. 5 illustrates an exploded view of the actuated wedge socket assembly of the present invention.

FIG. 3 illustrates a perspective view and FIG. 4 illustrates a top view of a fully assembled actuated wedge socket assembly 40 constructed in accordance with the present invention FIG. 5 illustrates an exploded view for ease of viewing without the wire rope.

The wedge socket assembly 40 includes a wedge socket 46 having an elongated hollow basket with a large opening at a first end 52 and a small opening at a second end 54. The wedge socket 46 also has an open interior cross-section tapering from the large end opening 52 to the small end opening 54. Accordingly, an opening is provided through the wedge socket.

The wedge socket 46 also includes a connector 56 extending from the first large end opening 52. The connector 56 may take many forms including a pair of opposed jaws with an opening through each jaw. The openings are axially aligned with each other to receive a transverse pin 86 (seen in FIG. 5) that may be retained in the openings by a cotter pin (not shown). The connector 56 would be used to connect the wedge socket assembly 40 to a load. The load may be directly connected to the connector 56 or, alternately, a block, hook, chain or other intermediary may be connected to the connector 56.

Other types of connectors may be employed within the spirit and scope of the invention.

Returning to a consideration of FIG. 2B and FIG. 4 and with continued consideration of FIGS. 3 and 5, the actuated wedge socket assembly 40 also includes a wedge 42 having a large end 62, an opposed small end 64, and a peripheral edge groove 66 in order to receive a wire rope 44 therein. The wedge 42 also includes an extended portion which, when inserted in the wedge socket 46, extends beyond the small opening end 54 of the wedge socket 46.

The actuated wedge socket assembly 40 of the present invention may also include a clamp 68 in order to secure the wire rope 44 to the wedge 42 through an opening in the wedge, particularly during assembly and installation.

In order to assemble and install the present invention, one end of the wire rope 44 is inserted and passed through the wedge socket 46 from the smaller end opening 54 through the larger end opening 52. Thereafter, the wire rope 44 is positioned in the peripheral groove 66 around the circumference of the wedge 42. The dead end 60 of the wire rope 44 is then run back through the hollow basket of the wedge socket 46 from the larger end opening 52 to the smaller end opening 54. The clamp 68 then connects the rope 44 to the wedge. The wedge 42 with the wire rope 44 around the circumference is then manually forced into the open basket of the wedge socket 46 as far as possible trapping the wire rope 44 between the edge of the wedge and the interior of the basket.

The present invention provides a mechanism to mechanically move and seat the wedge 42 and the wire rope 44 in the wedge socket 46 to a controlled depth.

In one preferred embodiment, a fork assembly 70 includes a pair of extending legs 72 and 74 to straddle the extended small end 64 of the wedge 42. The ends of the extending legs 72 and 74 react against the smaller end 54 of the wedge socket 46. A threaded bolt 76 extends through an opening in the fork assembly 70. The threaded bolt 76 is received in a threaded opening 78 in the extended small end 64 of the wedge 42 (visible in FIG. 2). As the bolt 76 is rotated in a first direction, the engagement between the threaded bolt 76 and the wedge will cause the wedge 42, and the wire rope 44, to be pulled into the wedge socket 46. Axial movement of the threaded bolt translates into movement of the wedge 42 and wire rope 44 into the socket. The amount of torque or force applied to rotating the threaded bolt 76 will determine the force pulling the wedge 42 and wire rope 44 into the wedge socket. The threaded bolt 76 may be rotated by a pneumatic wrench (not shown) or other tools readily available in the field.

Finally, a modified wire rope clip base 80 may be placed over the dead end 60 of the wire rope, and then a pair of fasteners 82 and 84 inserted through the wire rope clip base 80 with the fasteners 82 and 84 received in threaded openings 88 in the fork assembly 70. Accordingly, the dead end 60 of the wire rope is secured from dislodgement.

Figure 6:
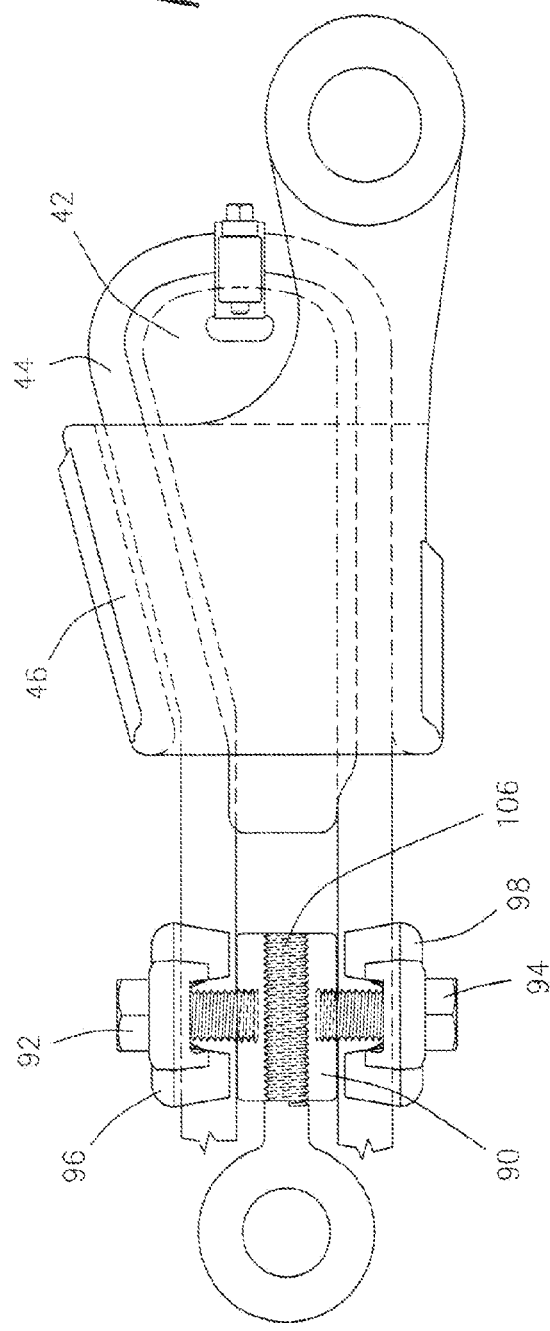
FIGS. 6 and 7 illustrate an alternate embodiment of the present invention.
Figure 7:
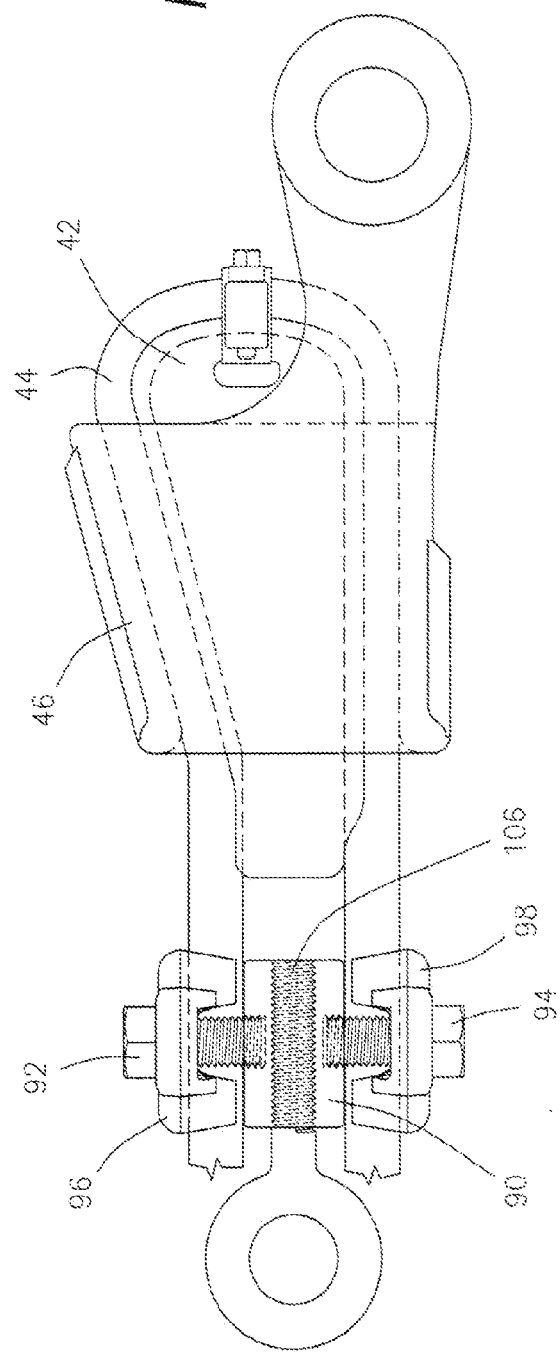

FIGS. 6 and 7 illustrate side views of an alternate mechanism to mechanically move and seat the wedge 42 and the wire rope 44 in the wedge socket 46 to a controlled depth. Again, one end of the wire rope 44 is inserted and passed through the wedge socket 46 from the smaller end opening 54 through the larger end opening. The wire rope is positioned in the peripheral groove and the dead end is run back through the hollow basket.

In FIG. 6, a body 90 having a threaded opening receives the threaded eye bolt 106 therethrough. The body 90 also has a pair of opposed threaded openings to receive opposed threaded fasteners 92 and 94 which hold clip bases 96 and 98, respectively, to secure the dead end and live end of the wire rope to the body 90. The fastener 92 passes through an opening in the clip base 96 while the fastener 94 passes through an opening in the clip base 98. The wedge socket 46 is restrained or attached to the dead end to resist movement. Accordingly, as the threaded eye bolt 106 is pulled, the wire rope is pulled taught against the wedge 42 and pulled into the wedge socket 46. FIG. 7 shows the wedge socket assembly fully installed and loaded.

Once the installation and loading are complete, the body 90, clip bases 96 and 98 and eye bolt 106 are removed.

FIG. 8 and FIG. 9 illustrates a further alternate mechanism to mechanically move and seat the wedge 42 and the wire rope 44 in the wedge socket 46 to a controlled depth. Again, one end of the wire rope 44 is inserted and passed through the wedge socket 46 from the smaller end opening 54 through the larger end opening. The wire rope is positioned in the peripheral groove and the dead end is run back through the hollow basket.

An L-shaped installation piece with legs 102 and 104 straddles the connector 56 extending from the socket 46 and a protective saddle rests against the wire rope. A threaded bolt 76 is received in a threaded opening in the L-shaped installation piece. The L-shaped installation piece rests against the wire rope 44 surrounding the wedge 42. The legs 102 and 104 of the installation piece engage a lip on the wedge socket 46. The L-shaped installation piece includes a pair of openings which align with the openings through the jaws of the connector 56 to receive the pin 86. As the threaded bolt 76 is rotated in a first direction, the edge of the socket 46 is engaged and, thereafter, the wedge 42 and wire rope 44 are forced into the socket 46 to a controlled depth. Once installation and loading are complete, the L-shaped installation piece and bolt are removed.

The present invention provides an actuated wedge socket assembly and may be utilized for new installations. The present invention may also be retrofit to existing wedge socket assemblies by replacing the existing wedge and supplying a mechanism to mechanically move and seat the wedge.

Whereas, the present invention has been described in relation to the drawings attached hereto, it should be understood that other and further modifications, apart from those shown or suggested herein, may be made within the spirit and scope of this invention.

What is claimed is:

1. An actuated wedge socket assembly which comprises:
    a wedge socket having an elongated hollow basket with a large opening at a first end, a small opening at an opposed second end, and an open interior cross section tapering from said large opening to said small opening;
    a wedge having a large end, an opposed small end, and a peripheral groove to receive a wire rope therein; and
    a mechanism to mechanically move and seat said wedge and said wire rope in said wedge socket to a controlled depth including a fork assembly having a pair of extending legs that straddle said wedge and that react against said second end of said wedge socket, and a threaded bolt extending through said fork assembly and received in a threaded opening in said small end of said wedge.

2. An actuated wedge socket assembly as set forth in claim 1 wherein said mechanism to mechanically move and seat to a controlled depth includes applying a desired rotational torque force to said threaded bolt.

3. An actuated wedge socket assembly as set forth in claim 1 including a wire rope clip base surrounding said wire rope and a pair of fasteners passing through said base and into said fork assembly.

4. An actuated wedge socket assembly as set forth in claim 1 including a clamp to attach said wire rope to said large end of said wedge.

5. An actuated wedge socket assembly as set forth in claim 1 including a connector extending from said first end of said wedge socket.

* * * * *